Oct. 23, 1962             A. F. SMITH             3,060,107

THIN FILM DISTILLATION APPARATUS

Original Filed March 22, 1955             3 Sheets-Sheet 1

INVENTOR.
ARTHUR F. SMITH

BY

ATTORNEY

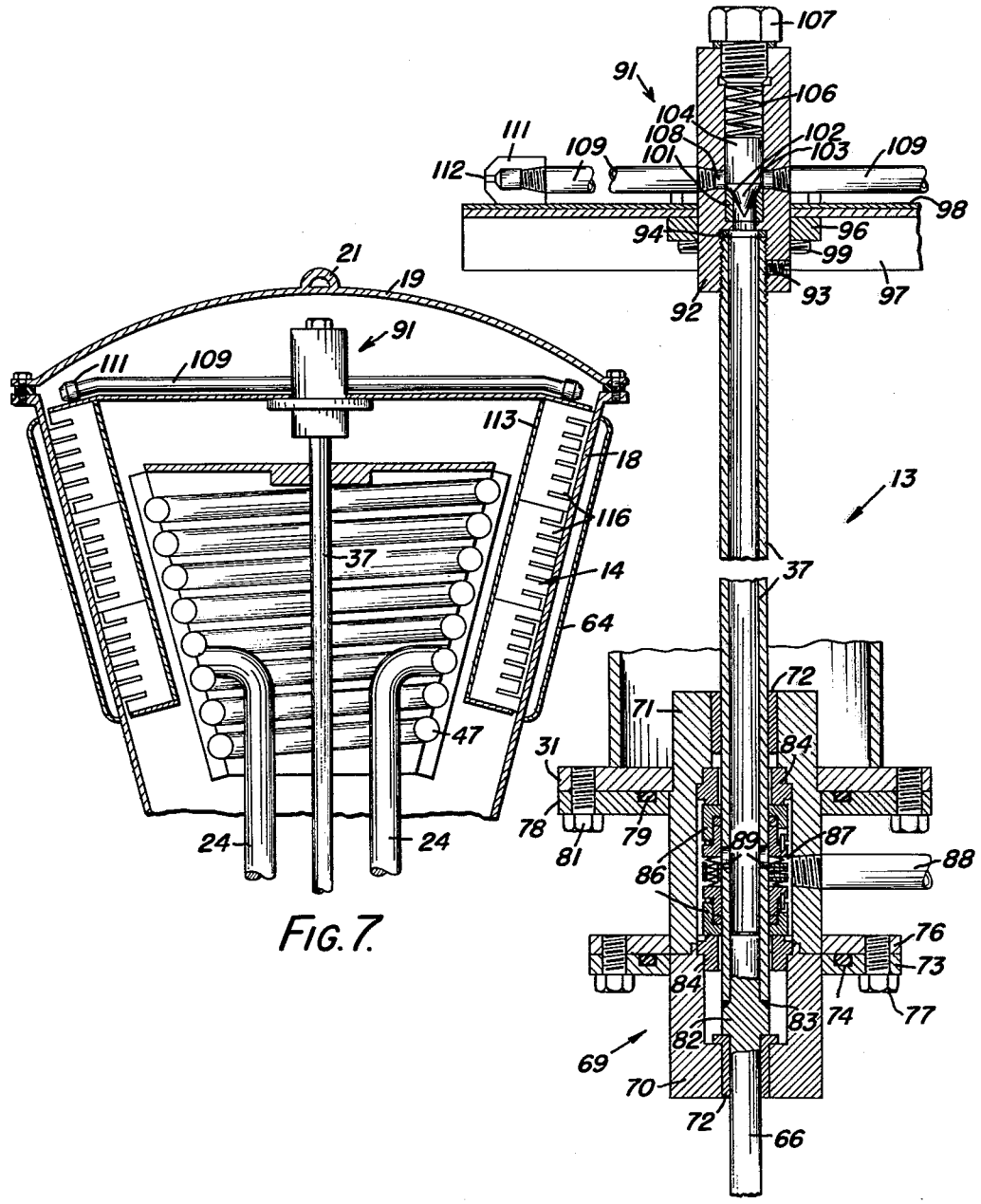

United States Patent Office 3,060,107
Patented Oct. 23, 1962

1

3,060,107
THIN FILM DISTILLATION APPARATUS
Arthur F. Smith, 1516 Lake Road, Webster, N.Y.
Continuation of application Ser. No. 495,973, filed Mar. 22, 1955. This application Aug. 11, 1958, Ser. No. 754,493
4 Claims. (Cl. 202—236)

This invention relates to distillation apparatus and a method of distillation. While the method and apparatus of my invention are primarily concerned with high vacuum or molecular distillation, the apparatus also includes means for distilling fluids under low vacuum conditions.

High vacuum unobstructed path distillation apparatus employing stationary vaporizing and condensing surface is well known. Such apparatus has a definite disadvantage in that it is difficult to control the flow of distilland over the stationary vaporizing surface and distribute it on said surface in a sufficiently thin film. The distribution of distilland takes place by gravitational flow and this limiting factor results in films of relatively great thickness.

To facilitate and understanding of the invention, certain phases of film type molecular distillation will be first briefly discussed. Molecules travel from the distilland film on the vaporizing surface to the condensing surface in what may be considered three steps: diffusion of the volatile molecules from the body of the distilland flowing over the surface of the vaporizing surface to the surface of the distilland film; projection of the volatile molecules from the surface of the distilland film into the vapor space; and movement of the volatile component across the vapor space to the condensing surface where condensation of the volatile molecules occurs.

The first step or diffusion stage takes place very slowly at best and is extremely sluggish in oils, waxes and greases, and many other naturally occuring or chemically prepared mixture of chemical compounds. In the molecular distillation of any material, progress of the volatile molecules flowing over the vaporizing surface in film flow toward the surface of that film is opposed by the heavy or more inert molecules of the material to such an extent that distillation is slowed down because only natural diffusion is relied upon to bring the volatile molecules to the surface of the film for distillation. Reliance upon natural diffusion of the molecules to the surface of the film represents one of the most serious limitations on the output capacity of film type distillation equipment.

Since as pointed out above distillation takes place on the surface of the film it has been proposed previously to maintain the film as thin as possible by rotating the vaporizing surface at relatively high speed. The film is then spread over the rotating vaporizing surface by centrifugal force. Rotation of the vaporizing surface to decrease the thickness of the film by centrifugal force represented a distinct advance in the art. However, the construction of equipment embodying a rotating vaporizing surface particularly where a large capacity distillation apparatus is desired, is not a simple problem. Rotation of the vaporizing surface at the speeds necessary to obtain thin film distribution of the distilland over the vaporizing surface presents problems of construction and operation of the distillation apparatus which need not be enumerated herein.

Because distillation apparatus in which the vaporizing surface is stationary is so much less expensive to build and more trouble free in operation, efforts have been made to improve the film distribution on stationary vaporizing surfaces. Representative of such efforts are Semon Letters Patent No. 2,460,602, issued February

2

1, 1959, entitled "Apparatus for Film-Type Distillations"; Madlen Letters Patent No. 2,500,900, issued March 14, 1950, entitled "Apparatus for Film-Type Distillation"; and Hickman et al. Letters Patent No. 2,403,978, issued July 16, 1946, entitled "Vacuum Distillation Apparatus."

The efforts represented by the patents set forth above have not been entirely successful, each of them having one or more of the following disadvantages: Irregularity of the vaporizing surface due to heat distortion which makes it difficult to maintain uniform contact between the mechanical means employed and the vaporizing surface; wear of the mechanical means employed, such as brushes, which renders them ineffective with only a short period of use; and too heavy a pressure, if rollers tightly fitting the vaporizing surface are employed, resulting in dry spots, "burning" of the vaporizing surface, and decomposition of the distilland. The pressure on the vaporizing surface should be light but constant and adapted to be regulated.

The distillation method and apparatus of my invention is also concerned with the directing of a spray of distilland on the vaporizing surface. While spray-type metering devices have heretofore been employed, such spray devices have not been capable of a wide range of variation of the volume of distilland supplied due to the fact that at low flow the metering nozzles clog. Large volume flow is difficult to attain, when desired, due to the throtting effect of the metering nozzles.

An object of my invention is to provide distillation apparatus which may be efficiently operated either for high or low vacuum distillation.

Another object of my invention is to provide distillation apparatus wherein both high and low vacuum distillation may be carried out and with essentially the same auxiliary equipment to the end that the apparatus may be operated more efficiently by taking advantage of thermally more efficient low vacuum distillation where possible.

Another object of my invention is to provide distillation apparatus which includes a stationary condensing surface and a stationary vaporization surface to which the distilland is supplied, the invention including apparatus and a method of supplying distilland to said vaporizing surface and maintaining it spread in a thin film over said surface to the end that increased effiiciency is attained, dry spots on said vaporizing surface and decomposition of the distilland are avoided.

A further object of my invention is to provide a method of and means for supplying distilland to the vaporizing surface of distillation apparatus wherein the volume of distilland supplied is proportional to the pressure at which the distilland is pumped to the end that the volume of distilland supplied is variable over a wide range and the use of metering nozzles which tend to clog at low volume and pressure and exert a throttling effect at high volume and pressure are avoided.

Still another object of my invention is to provide a method of distributing distilland on a vaporization surface which includes the steps of flowing the distilland over said surface in a film, continuously wiping surplus distilland from said surface to the end that the film is maintained as thin as possible, collecting the surplus distilland, and redistributing said surplus back onto the vaporization surface.

My invention further contemplates maintaining the distilland flowing by gravity over the vaporizing surface of distillation apparatus in a thin film by a multiplicity of relatively small separately mounted wiper elements, said wiper elements being rotated and being free floating independently of each other so that as they are thrown into engagement with said vaporizing surface by centrifugal force they exert a light but constant pressure on said surface and are free to follow any irregularities existent in said surface to the end that dry spots are avoided and a substantially constant thin film of distilland exists on said surface.

Other objects and advantages of my invention will be apparent from the following description, when taken in connection with the accompanying drawings, in which:

FIG. 6 is a sectional view showing the drive for the vaporization surface wiper blades and the means for delivering distilland to the vaporization surface; and FIG. 7 is a diagrammatic view of an alternate form of vaporization unit.

Figure 1:
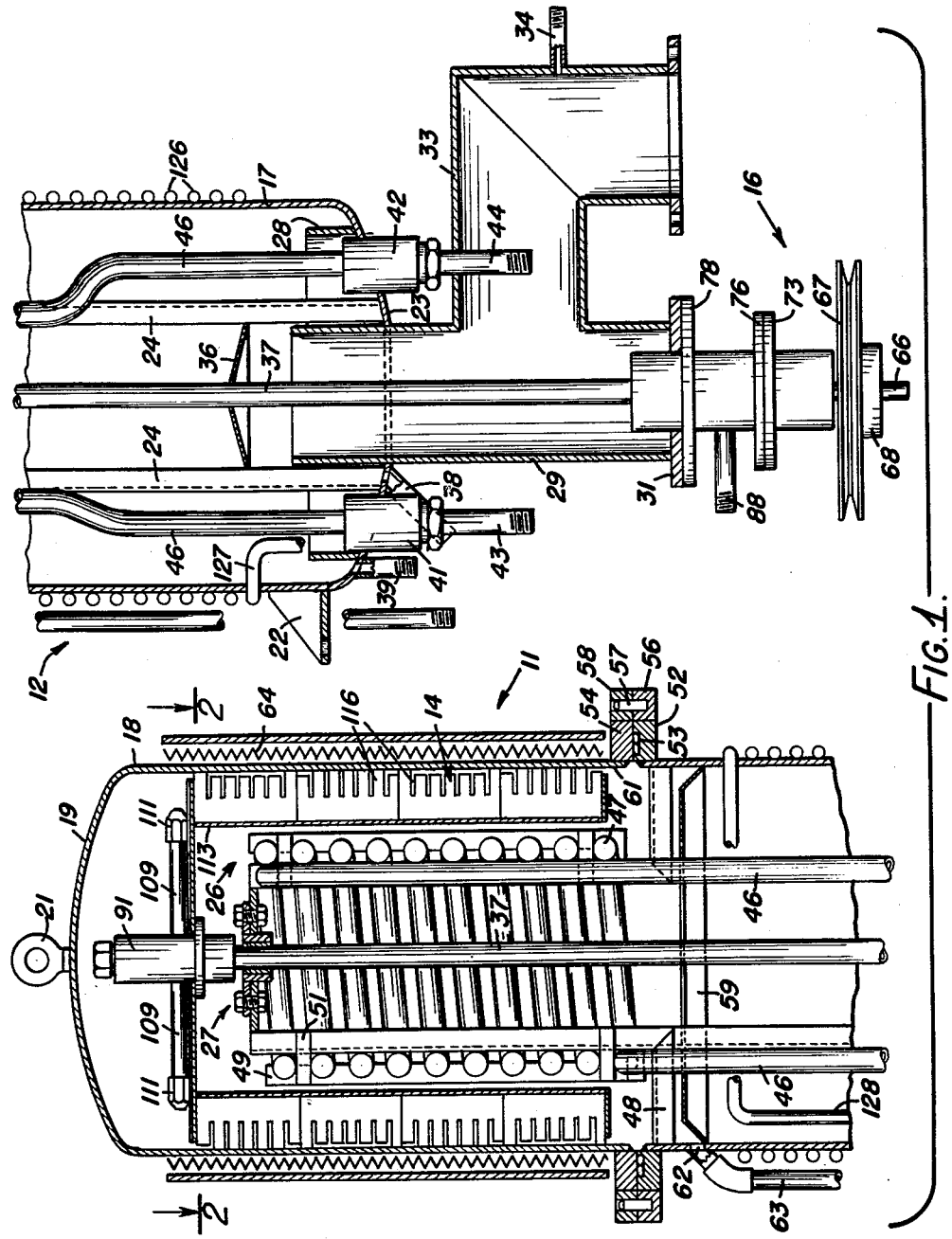
FIG. 1 is a vertical sectional view taken through the distillation apparatus of my invention.

The distillation apparatus of my invention includes a high vacuum or molecular distillation unit generally indicated by the numeral 11; an equilibrium distillation unit generally indicated by the numeral 12; mechanism generally indicated by the numeral 13 (FIG. 6), for delivering distilland to the distillation unit; a wiper assembly generally indicated by the numeral 14, for maintaining a thin film of distilland on the vaporization surface of the high vacuum distillation unit 11; and driving mechanism generally indicated by the numeral 16, for rotating the distilland delivery mechanism 13 and the wiper assembly 14.

The apparatus of my invention will first be considered solely as a high vacuum or molecular distillation unit since the apparatus has been designed primarily for this purpose. The distillation apparatus comprises a lower shell 17 and an upper shell 18 having a dished head 19 and an eyelet 21 by which the upper shell may be lifted off the lower shell.

The lower shell 17 has a plurality of supports 22 spaced around its external periphery by which the distillation apparatus may be supported on a raised foundation. In the case of large distillation units, the lower faces of the supports 22 may rest on the floor and such portions of the apparatus which lie below the supports may extend through the floor into the room below. The upper and lower shells may be made of stainless steel or any other material resistant to corrosion and high temperatures. In the case of some materials being distilled it may be desirable to glass-coat the interior walls of the lower and upper shells 17 and 18 to render them corrosion-resistant to the particular materials being distilled.

Welded as shown at 23 to the internal bottom wall of the lower shell is a plurality, in this case four angle irons 24, two of which are not shown, which serve as supports for a condenser, generally indicated by the numeral 26, and bearing assembly generally indicated by the numeral 27. The bottom wall of the lower shell further has welded thereto a vertically extending circular retaining wall 28 the purpose of which will later appear. An opening is provided in the center of the bottom wall of the lower shell 17 through which a preferably stainless steel conduit 29 extends. The conduit has a plate 31 welded to and closing its lower end, the plate serving as a support for the driving mechanism, generally indicated by the numeral 16, as will presently more fully appear.

Extending sidewardly from the conduit 29 and preferably welded thereto is a conduit 33 which is connected to a vacuum pump (not shown). A nipple 34, for connection to a pressure gauge (not shown), is provided to permit visual observance of the vacuum conditions existing in the distillation apparatus. The vacuum pump employed may be of the high vacuum diffusion type, it being understood that the apparatus is designed for use down to a vacuum equivalent of one micron of mercury, all joints in the apparatus being critically tight for this purpose.

The conduit 29 opens into the vapor space of the lower shell 17 and above the open end thereof and welded to the angle supports 24 is a conical shield 36. The shield 36 is slightly spaced from a tubular shaft 37 which extends upwardly through the conduit 29 and is driven by the driving mechanism generally indicated by the numeral 16. The conical shield 36 serves to cause the uncondensed vapor to take a circuitous path and thereby enable its condensation and minimize its access to the opening of the conduit 29. The bottom wall of the lower shell 17 also includes a first distillate outlet 38 and a second distillate outlet 39, these outlets being located interiorly and exteriorly respectively of the retaining wall 28.

The bottom wall of the lower shell 17 further has a pair of openings for the reception of adapters 41 and 42 each of which is shown angularly out of actual position so that they may be viewed in FIG. 1. The adapter 41 is connected to a condensing liquid inlet pipe 43 and the adapter 42 is connected to a condensing liquid outlet 44. The condensing liquid inlet and outlet may be connected together in a circulating system which may include a cooling unit. The condensing liquid may be water.

The adapters 41 and 42 receive conduits 46 which form a closed circulating circuit with a high vacuum or molecular coil-type condenser 47 which comprises a number of turns of piping. While it would be possible to provide a separate condensing surface cooled by the coil 47 preferably, in the apparatus of my invention, the exposed coil surfaces serve as the condensing surface.

The vertically extending supports 24 for the stationary high vacuum condenser 47 have supporting angle irons 48 welded to the interior wall of the lower shell and extending inwardly and welded to the angle iron supports 24. A plurality of metal supports 49 have semi-circular cutouts for the reception of the coils of the condenser 47 and these metal supports 49 are tied to the vertically extending supports 24 by brackets 51.

An annular ring 52 having a machine faced upper surface is welded to the lower shell 17 and has an annular machined recess 53 for the reception of O-ring packings. An annular ring 54 has a machined lower face which mates with the upper face of the ring 52 and compresses the O-ring packings to provide a sealed joint. No fastening means between the upper and lowers shells is necessary since the weight of the upper shell and atmospheric pressure on the exterior of the shell is sufficient to compress the packing and maintain a tight seal. A pair of bosses 56 is welded to the lower ring 52 and carries locating pins 57 adapted to register in openings formed in bosses 58 welded to the upper ring 54.

A frusto-conical residue collector 59 having a large through opening is welded to the interior of the lower shell 17 and serves to collect undistilled distilland flowing downwardly along the inner wall 61 of the upper shell 18 which constitutes the vaporizing surface of the unit. Above the lower edge of the frusto-conical residue collector 59 is an opening 62 which is connected to a pipe 63 through which undistilled distilland flows to a place of collection or to another distillation unit in series with the unit shown herein. A heater diagrammatically illustrated at 64 surrounds the exterior wall of the upper shell 18. Any suitable heating medium may be employed.

The lower end of the distilland delivery assembly generally indicated by the numeral 13, includes a shaft 66 upon which a pulley 67 is removably but rigidly mounted by means of a collar 68. The pulley 67 is driven by a prime mover (not shown). When it is desired to change the speed of the shaft 66, the pulley 67 is removed and a larger or smaller diameter pulley substituted therefor. In lieu of changing pulleys the shaft 66 may be connected to a variable speed motor. The purpose of being able to vary the speed of rotation of the shaft 66 will be more fully explained later.

Referring now to FIG. 6, the shaft 66 enters a stuffing box generally indicated by the numeral 69. The stuffing box comprises a lower section 70 and an upper section 71, each section being provided with a sleeve bearing 72 pressed into a bore in the stuffing box. The lower stuffing box section 70 has a flange 73 welded thereto which has an annular recess 74 for the reception of O-ring packing material. The upper stuffing box section 71 has a flange 76 welded thereto, the two flanges being fastened together by an annular ring of studs 77. The upper stuffing box section 71 has a flange 78 welded thereto which has an annular groove 79 for the reception of O-ring packing. An annular ring of studs 81 secures the flange 78 to the plate 31, the driving mechanism 16 and the stuffing box 69 being thus carried by and suspended from the plate 31.

The shaft 66 enters the stuffing box and has an enlarged portion 82 which seats on a flange formed on the bearing 72. The upper part of the enlarged portion 82 is welded as shown at 83 to the lower end of the tubular shaft 37, the shaft 66 entering the tubular shaft 37 as shown.

Internally of the stuffing box, upper and lower flanged bearings 84 are provided which, in addition to guiding the tubular shaft 37, serve as seats for upper and lower mechanical seals 86. Mechanical seals of the type shown are well known in the art and need not be described except to state that they seal off a chamber 87 into which distilland is pumped through a pipe 88. Openings 89 provided in the tubular shaft 37 give access between the chamber 87 and the interior of the shaft 37. The distilland is usually heated and pumped into the tubular shaft 37 under pressure from a variable speed positive displacement pump which is capable of adjustment through a wide range of volumes and pressures. Pumps of this type are well known in the art and need not be shown or further described.

A combined needle valve and distilland discharge assembly, generally indicated by the numeral 91, is mounted on the top of the tubular shaft 37. For this purpose a valve body 92 is secured by means of a set screw 93 to the upper end of the tubular shaft 37, a gasket 94 being interposed between the peripheral upper edge of the shaft 37 and the bore in the valve body which the shaft enters. A plate 96 is rigid with the valve body 92 and is secured to a structural member 97 and a circular disc 98 by means of studs 99 (FIG. 6).

The valve body has a sleeve 101 of hardened metal pressed therein, the upper end 102 of which is frusto-conical to form a seat for the conical end 103 of a needle valve 104. The needle valve 104 is pressed by a relatively heavy spring 106 toward engagement with its seat, the upper end of the spring seating on the end of a cap screw 107.

The valve body 92 has radially extending openings 108 which are threaded for the reception of pipes 109 to the outer ends of which nozzles 111 are secured as by threading. The nozzles have through openings terminating in orifices 112. Any desired number of radial pipes 109 and discharge nozzles may be employed. The distillation apparatus shown in the drawings is of relatively small size but in the case of a large diameter distillation unit it would be desirable to employe a greater number of discharge nozzles.

One of the important aspects of my invention is the manner of regulating the flow of distilland and its discharge onto the vaporization surface or wall 61. In conventional apparatus with which I am familiar, metering orifices are employed. In the construction described above, the nozzle orifices 112 do not meter the flow of distilland. The nozzle orifices have sufficient capacity to take care of the maximum amount of distilland to be supplied to the unit without the orifices exerting any appreciable throttling effect. I have found metering orifices to be of distinct disadvantage particularly when the apparatus is used in distilling relatively sluggishly flowing fluids such as oils and greases. These disadvantages lie in the fact that metering orifices tend to clog with sluggish flowing liquids when only a small quantity of distilland is supplied to the apparatus as is sometimes necessary On the other hand, when it is desired to supply a large quantity of distilland to the apparatus, the metering orifices exert a throttling effect, cutting down the supply of distilland which may be discharged onto the vaporizing surface. In other words, metering orifices have a limiting effect on the quantity of distilland that can be supplied. They can be employed only over a relatively narrow volume range even when the distilland is supplied at exteremely high pressures. With metering orifices, when pressure and volume are plotted against each other the result is a curve in which the capacity of the orifice does not increase in proportion to the increase in pressure.

In the arrangement above described the orifices have no other function than to deliver the distilland in a spray to the vaporization surface. The pressure capacity curve of the valve 102—104 is a straight line, the volume discharged through the orifices 112 being substantially a direct function of the pressure. As the pressure is increased, the spring 106 is compressed approximately an equal amount for equal increments of pressure. The cross-sectional area of the valve opening is a substantially direct function of pressure allowing large capacity flow when desired without throttling and at the same time permitting the use of low pressures when small capacities are desired without clogging. Moreover, the valve is essentially self-cleaning.

It will be now apparent that as the tubular shaft 37 is rotated, the valve body 92, the nozzles 111 and the structural member or support 97 rotate as a unit. The distilland issuing from the nozzles is sprayed onto the vaporization surface 61. The spray of distilland being continuous and rotating, the flow of distilland on the vaporization surface is substantially continuous. The quantity of distilland issuing from the discharge nozzles may be closely regulated in accordance with desired operating conditions merely by regulating the speed of the pump or more accurately its discharge pressure. For example, the discharge pressure of the pump may be regulated without changing the speed of the pump by a throttling valve on the discharge side of the pump.

Figure 2:
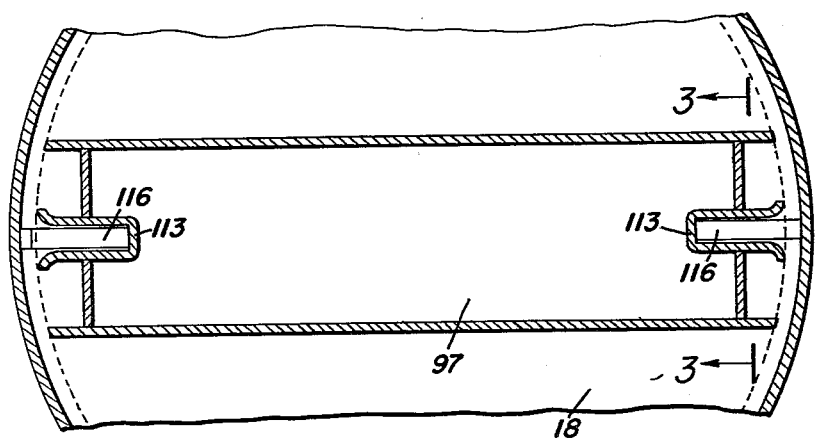
FIG. 2 is a partial sectional view taken substantially on the line 2—2 of FIG. 1 in the direction indicated by the arrows.
Figure 3:
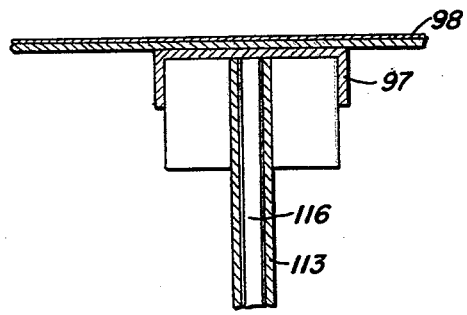
FIG. 3 is a sectional view taken substantially on the line 3—3 of FIG. 2 in the direction indicated by the arrows.

As shown most clearly in FIGS. 1, 2 and 3, carried by the structural member or support 97 and depending vertically therefrom is a pair of channel members 113. These channel members open outwardly toward the vaporizing surface 61 and preferably extend essentially radially with respect to the axis of rotation of the tubular shaft 37. The channel members extend substantially throughout the vertical extent of the upper shell 18 and the edges which face the vaporization surface 61 are curved outwardly as shown, which edges are spaced from the vaporization surface 61. Mounted in each of the channels 113 is a plurality of vaporization surface wiper elements 116. These wiper elements are loose in the slots 113 so that they are free to shift outwardly due to centrifugal force when the tubular shaft 37 is rotated.

Figure 4:
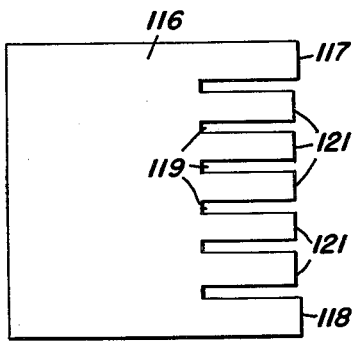
FIG. 4 is a face view illustrative of one of the vaporizing wall wiper blades of my invention.
Figure 5:
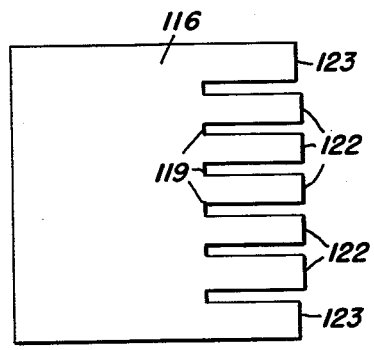
FIG. 5 is a view illustrative of another wiper blade.

In FIGS. 4 and 5, I have shown two of the wiper elements 116 merely by way of illustration. The wiper element of FIG. 4 has a vaporizing surface engaging part 117 at its upper edge and a vaporizing surface engaging part 118 at its lower edge. The wiper is further provided with inwardly extending slots 119, in this case six in number. Cut back a matter of a few thousandths of an inch from the vaporizing surface-engaging portions 117 and 118 are edges 121 defined by the slots. The amount of cutback of the edges 121 with respect to the vaporizing surface-engaging parts 117 and 118 should be small, for example, I have found a cutback of from a few thousandths of an inch to $3\frac{3}{1000}$ of an inch to be satisfactory.

Considering now the action of the wiper element shown in FIG. 4, it will be understood that the distilland is flowing over the vaporizing surface in a relatively thick film. This film is too thick for efficient molecular distillation for the reasons previously stated. The purpose of the surface-engaging portions 117 and 118 is to wipe the vaporizing surface with a light pressure and decrease the thickness of the film. A decrease in the thickness of the film enables more rapid diffusion of the volatile molecules from the body of the film to the surface of the film. Volatile molecules are then free to leave the free surface of the film and move across the vapor space toward the condenser.

A wiper element continuous from the top of the vaporizing surface substantially to the bottom thereof would cause a building up of distilland on the leading edge of the wiper which distilland would run down the surface in a rivulet. Such distilland would not, as is obvious, be subjected to any substantial exposure to the distillation process. As the wiper element of FIG. 4 rotates, a rivulet of distilland builds up only on the leading edges of the vaporizing surface engaging portions 117 and 118 thereof. This rivulet runs down the vaporizing surface and is spread out in a thin film either by the cutback portions 121, or by the cutback portions 123 (FIG. 5) of the next lower wiper element. Due to centrifugal force, the distilland caught by these slots is thrown out toward the vaporizing surface and is redistributed over the surface by the cutback portions 121. Each wiper blade, as shown in FIG. 4, thus causes a continuous wiping of the surface to leave only a thin film thereon, a collection of the surplus and a redistribution of the wiped distilland over the vaporizing surface to be followed, as will presently appear, by an almost instantaneous rewiping of the surface.

In FIG. 5 I have shown a wiper in which the vaporizing surface-engaging portions are at 122 and the recessed or cutback portions are at 123. The wiper is also provided with slots 119 as in the case of the wiper element of FIG. 4. Upon a comparison of FIGS. 4 and 5, it will be noted that the surface-engaging portions 122 are oppositely disposed with respect to the non-surface engaging portions 121 of FIG. 4. Likewise the surface-engaging portions 117 and 118 of FIG. 4 are oppositely disposed with respect to the non-surface engaging portions 123 of FIG. 5. The wiper elements of FIGS. 4 and 5 are intended to be complementary to each other and are mounted in the same vertical plane 180 degrees apart in the particular apparatus shown in the drawings, in horizontal registry with each other. Thus as the two horizontally registered wiper elements sweep the vaporizing surface, that portion of the distilland picked up by the slots 119 of the wiper of FIG. 4 and redistributed over the vaporizing surface is almost immediately spread thinly over that surface by the surface-engaging parts 122 of the wiper element shown in FIG. 5. The wiper elements in the same vertical plane that are spaced 180 degrees apart in horizontal registry, respectively, are complementary to each other, as shown in FIG. 1 so that those portions of the vaporizing surface over which the recessed portions of one vertically aligned set of wiper elements passes are engaged by the surface-engaging portions, respectively, of the trailing vertically aligned set of wiper elements.

Throughout the vertical extent of the vaporizing surface there is a continuous thinning of the film; a wiping off and collection of the surplus; a redistribution of that surplus over the surface; and an almost immediate rewiping of redistributed surplus so that in general over most of the area of the vaporizing surface a thin film is flowing gradually in a downward direction. It will be understood from the illustrations of FIGS. 4 and 5, that the series of wiper elements shown in each of the two vertically extending slots 113 may be variously made to provide wiping portions, collecting slots and distilland redistribution portions. It will further be understood that the method described above may be accomplished by other mechanical means than those specifically shown and described.

An important aspect of this phase of applicant's invention is that the free flow of distilland down the vaporizing surface is not that of a film falling by gravity over a vertical surface nor that produced by an element elongated in a vertical direction and rolling or frictionally moving over the vaporizing surface which would produce a free falling rivulet. In applicant's method and with applicant's construction, no free falling film or rivulet exists. The falling film is interrupted and retarded and any falling rivulet is almost immediately interrupted or broken up. With an equal volume of distilland supplied to the vaporizing surface, the time required for any molecule to reach the residue collector 59 is materially increased. The exposure time of each molecule to the heated vaporizing wall is increased thereby in general increasing the temperature of the distilland and molecular activity.

Another important aspect of this phase of my invention lies in the fact that the pressure of the wiper elements on the vaporization surface may be any desired amount. For example, the tubular shaft 37 may be rotated at 60 revolutions per minute. However, the speed may vary from 12 to 120 revolutions per minute. In general, large diameter reactors are driven at slower speeds. This will cause the wiper elements to exert a certain pressure against the vaporizing surface. If it is desired to increase or decrease this pressure, all that is required is to vary the speed of rotation of the shaft 37 until the desired wiper pressure is attained. The optimum is reached when the thinnest film possible is maintained on the vaporizing surface without causing dry spots or "burning" of the vaporizing surface.

A further important aspect of this phase of my invention lies in the fact that the wall of the upper shell is subjected to high temperatures which usually causes some distortion or unevenness of the vaporizing surface. By employing a multiplicity of small wiper elements with each element free and movable radially independent of its adjacent elements, each element is free to follow the wall contour. This fact assures the maintenance of wiper efficiency, even though the vaporizing surface may have become somewhat warped and distorted. Since the wiper elements accurately follow the wall contour, areas of thick film and areas where the wall is dry and likely to "burn" are almost completely avoided.

Preferably the wiper elements are made of a carbon-graphite composition which is self-lubricating, long wearing and resistant to high temperatures. The wiper elements need be renewed only after long periods of use since they are free to shift outwardly in the slots to compensate for wear.

It will be understood that I have shown in the drawings a relatively small distillation unit. In the case of a unit large in diameter, it might be desirable to employ as many as 12 vertical rows of wiper elements. However, the principles upon which the wiper elements are made would remain essentially the same, namely, the wiper elements would be formed so as to wipe the surface, pick up the surplus distilland and redistribute over the surface. In general wiper elements in the same vertical plane in successive vertical slots would be complementary to each other in accordance with the disclosure of FIGS. 4 and 5. However, it might be desirable in a large unit to make three or more successive wiper elements considered as a group complementary.

It will be understood that when the distillation apparatus thus far described is operated, undistilled distilland flowing downward over the vaporizing surface 61 accumulates in the residue collector and flows outward through the pipe 63 to a point of discharge or may flow to another distillation unit where another fraction of the distilland may be removed. The distillate is condensed on the condenser 47 and drips therefrom or flows downward along the tubes 46 into the trough defined by the retaining wall 28. From thence it flows out through the outlet 38 to a place of collection.

Mounted externally of the lower shell 17 is a condenser 126 which has an inlet 127 and an outlet 128 connected to a source of cooling liquid and pumped through the condenser by means of a pump (not shown). The condenser 126 results in a cooling of the wall of the lower shell which causes vapors to condense on these cooled walls. This condensate flows down into the trough external of the retaining wall 28. The condensed vapors or distillate flows outward through the outlet 39 to a place of collection. When the condensing coil 126 is in operation, there is a continual condensing of vapors from the interior of the lower shell on the cooled walls. In general the lower shell, when the condenser 126 is in operation, constitutes an equilibrium distillation unit. A distillation unit operating in equilibrium is one in whch the vapor pressure of the liquid approximates the vacuum existent.

One of the important aspects of this phase of the invention lies in the fact that the two condensers 47 and 126 may be operated independently of each other. When the upper condenser is in operation, the thermal efficiency of the unit is low due to the proximity of the condenser 47 to the hot vaporization wall 61. However, in connection with certain mixtures where a high boiling point constituent is present and its withdrawal is desired, the condenser 47 may be shut off. The high boiling point constituent will then condense on the walls cooled by the condenser 126.

In FIG. 7 I have diagrammatically shown a high vacuum distillation unit, the vaporizing surface 61 of which is at an angle to the vertical. Essentially this unit operates the same as the high vacuum unit previously described and the parts thereof have therefore been correspondingly numbered. The advantage of the sloping wall vaporizing surface is to decrease the effect of gravity on the distilland flowing over the surface. As previously mentioned, it its desirable to maintain the distilland on the vaporizing surface as long as possible. Moreover, in the construction shown, the gravitational effect on the wiper elements is such as to urge them into engagement with the vaporizing surface. In addition of course light springs could be used behind the wiper elements to urge them into engagement with the vaporizing surface. However, centrifugal force is much the preferred method as the pressure of the wipers is subject to easy control by varying the speed of rotation of the shaft 37.

While I have shown and described the preferred form of my invention and the preferred method of operating the apparatus of my invention, it will be apparent that various changes may be made therein, particularly in the form and relation of parts, without departing from the spirit of my invention as set forth in the appended claims.

This application is a continuation of 495,973, filed March 22, 1955, and now abandoned.

I claim:

1. Apparatus for processing liquid in a thin film comprising a body having a chamber that is formed with an internal surface of revolution having an upright axis, means for supplying liquid to said surface to flow downwardly thereover in a film under the influence of gravity, a rotor that is mounted for rotation about an axis that is disposed within said surface and that includes a generally U-shaped channel member that is disposed with the open mouth of the channel confronting said surface of revolution, said channel member having axially-extending parallel sidewalls, a vertically arranged series of wiper blades having substantial radial extent disposed in said channel in superposed relation and with their sides engaging the sidewalls of said channel member in sliding relation over substantial, radially extending portions thereof, each said blade having an axial length less than the axial length of said surface of revolution and being free to move radially independently of said other blades, each blade being formed with radially projecting lands and with recesses between said lands, said lands and said recesses having substantial angular extent relative to said surface of revolution and said blades being mounted so that said lands engage said surface of revolution over broad bearing areas of substantial angular extent under centrifugal force upon rotation of said rotor, to remove liquid from said surface of revolution, and said lands and said recesses being arranged to remove liquid at the leading edge of each of said lands and to direct the removed liquid into said recesses to mix it therein and to return it therefrom to said surface, again to flow downwardly thereover in a film under the influence of gravity, thereby upon rotation of said rotor to cause the lands of said blades continuously to engage said surface of revolution to remove the liquid from said surface and to return it to said surface, to maintain the liquid in an agitated, turbulent state, the sidewalls of said channel serving to maintain said blades at a constant orientation relative to said surface of revolution.

2. Apparatus for processing liquid in a thin film comprising a body having a chamber that is formed with an internal surface of revolution having an upright axis, means for supplying liquid to said surface to flow downwardly thereover in a film under the influence of gravity, a rotor mounted within said chamber for rotation about an axis that is disposed within said surface, a pair of generally U-shaped channel members mounted on said rotor in fixed, spaced relation to each other for movement together relative to said surface upon rotation of said rotor, said channel members being disposed with the open mouths of their respective channels confronting said surface, said channel members having axially-extending parallel side walls, a vertically arranged series of wiper blades disposed in each of said channels, the blades in each of said series being disposed in superposed relation and having sides that engage the side walls of the respective channel member in which they are seated in sliding relation over radial portions thereof of substantial extent whereby the channel member can maintain said blades at a constant orientation relative to said surface of revolution, each said blade having an axial length less than the axial length of said surface and each being free to move radially independently of said other blades, each blade being formed with radially projecting lands and with recesses between said lands, said lands and said recesses having substantial angular extent relative to said surface of revolution and said blades being mounted so that said lands engage said surface of revolution over broad bearing areas of substantial angular extent under centrigual force upon rotation of said rotor, to permit said lands to remove liquid from said surface of revolution, said lands being arranged to remove liquid at the leading edge of each of said lands, said recesses being arranged to receive the removed liquid and to direct it therethrough to mix it therein and to return it therefrom to said surface, again to flow downwardly thereover in a film under the influence of gravity, thereby upon rotation of said blades continuously to remove the liquid from said surface, mix it, and return it to said surface, to maintain the liquid in an agitated, turbulent state, the blades that are mounted in the channel of one of said members having their respective radially projecting lands axially displaced relative to the lands of the blades that are mounted in the channel of the other of said members, thereby to engage surface areas of said surface of revolution other than those that are engaged by the lands of the blades that are mounted in the channel of the other of said members.

3. Distillation apparatus for distilling liquid in the form of a thin film, comprising a body having a chamber that is formed with an internal surface of revolution having an upright axis, a condenser disposed in said chamber in radially spaced relation to said surface of revolution, means for supplying liquid to said surface to flow downwardly thereover in a film under the influence of gravity, means for heating the liquid in said film, a rotor that is mounted for rotation about an axis that is disposed within said surface and that includes a guide member that is interposed between said condenser and said surface of revolution, a vertically arranged series of wiper blades having substantial radial extent mounted on said rotor in sliding engagement with said guide member over radial portions thereof of substantial extent to permit said guide member to maintain said blades at a constant orientation relative to said surface of revolution, and mounted in superposed relation relative to each other, each said blade having an axial length relative to said surface of revolution that is less than the axial length of said surface of revolution, and each said blade being free to move radially independently of said other blades, each blade being formed with radially projecting lands and with recesses between said lands, said lands and said recesses having substantial angular extent relative to said surface of revolution and said blades being mounted so that said lands engage said surface of revolution over broad bearing areas of substantial angular extent under centrifugal force upon rotation of said rotor, to remove liquid from said surface of revolution, said lands and said recesses being arranged to remove liquid at the leading edges of said lands and to direct the removed liquid into said recesses to mix it therein and to return it therefrom to said surface, again to flow downwardly thereover in a film under the influence of gravity, thereby upon rotation of said rotor to cause the lands of said blades continuously to engage said surface of revolution to remove the liquid from said surface, mix it, and return it to said surface, to maintain the liquid in an agitated, turbulent state.

4. Distillation apparatus for distilling liquid in a thin film comprising a body having a chamber that is adapted to be evacuated and that is formed with an internal surface of revolution having an upright axis, a condenser disposed in said chamber in radially spaced relation to said surface, means for supplying liquid to said surface to flow downwardly thereover in a film under the influence of gravity, means for heating the liquid in said film to vaporize at least a portion thereof, a rotor mounted in said chamber for rotation about an axis that is generally coaxial with the axis of said surface, a pair of generally U-shaped channel members mounted on said rotor and interposed between said condenser and said surface of revolution for movement together relative to said surface upon rotation of said rotor, said channel members being disposed with the open mouths of their respective channels confronting said surface, each said channel member having axially-extending parallel side walls, a vertically arranged series of wiper blades disposed in each of said channels, the blades in each of said series being disposed in superposed relation relative to each other and with their sides engaging the side walls of the respective channel member in which they are seated in sliding relation over radial portions thereof of substantial extent whereby the channel member can maintain said blades at a constant orientation relative to said surface of revolution, each said blade having an axial length less than the axial length of said surface and being free to move radially independently of said other blades, each blade being formed with radially projecting lands and with recesses between said lands, said lands and said recesses having substantial angular extent relative to said surface of revolution and said blades being mounted so that said lands engage said surface of revolution over broad bearing areas of substantial angular extent under centrifugal force upon rotation of said rotor, to permit said lands to remove liquid from said surface of revolution, said lands being arranged to remove liquid at the leading edge of each of said lands, said recesses being arranged to receive the removed liquid and to direct it therethrough to mix it therein and to return it therefrom to said surface, again to flow downwardly thereover in a film under the influence of gravity, thereby upon rotation of said blades continuously to remove the liquid from said surface, mix it, and return it to said surface, to maintain the liquid in an agitated, turbulent state, the blades that are mounted in the channel of one of said members having their respective radially projecting lands axially displaced relative to the lands of the blades that are mounted in the channel of the other of said members, thereby to engage surface areas of said surface of revolution other than those that are engaged by the lands of the blades that are mounted in the channel of the other of said members.

References Cited in the file of this patent

UNITED STATES PATENTS

| | | |
|---|---|---|
| 2,403,978 | Hickman et al. | July 16, 1946 |
| 2,500,900 | Madlen | Mar. 14, 1950 |
| 2,542,269 | Zahm | Feb. 20, 1951 |
| 2,546,381 | Zahm | Mar. 27, 1951 |
| 2,749,292 | Perry et al. | June 5, 1956 |
| 2,766,193 | Schneider | Oct. 9, 1956 |
| 2,793,174 | Smith | May 21, 1957 |
| 2,855,345 | Mares | Oct. 7, 1958 |